J. LEIST.
Saw-Gage.
No. 218,287.  Patented Aug. 5, 1879.
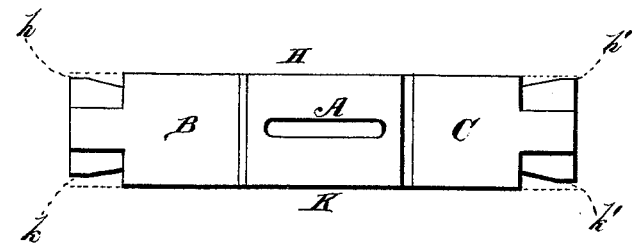
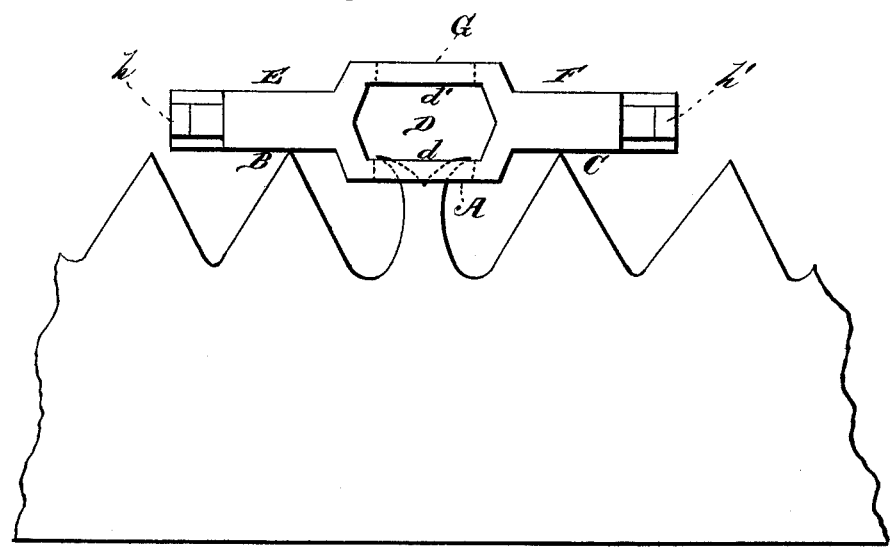
WITNESSES
Robert Everett
W. N. Severance
INVENTOR,
John Leist.
Gilmore, Smith & Co.
ATTORNEYS

UNITED STATES PATENT OFFICE.

JOHN LEIST, OF STURGEON BAY, WISCONSIN.

IMPROVEMENT IN SAW-GAGES.

Specification forming part of Letters Patent No. 218,287, dated August 5, 1879; application filed May 31, 1879.

*To all whom it may concern:*

Be it known that I, JOHN LEIST, of Sturgeon Bay, in the county of Door and State of Wisconsin, have invented certain new and useful Improvements in Saw-Gages; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a front of my saw-gage, and Fig. 2 is a view of a saw, showing my gage applied.

My invention relates to saw-gages; and it consists in a device of glass formed to serve as a gage for filing the rake-teeth of a saw to suitable lengths for sawing different kinds of timber, and also for setting the cutting-teeth at different widths of cut to suit the operator, as will herein more fully appear.

In order to secure the maximum speed and ease in sawing, the drag-teeth should be of uniform length; and I have discovered that for sawing hard wood these teeth should be about one sixty-fourth of an inch shorter than the cutting-teeth, and for sawing soft wood about one thirty-sixth shorter; also, for sawing hard and soft wood, and hard and soft wood when frozen, it is found advantageous in securing the maximum speed and ease in sawing to set the saw differently.

I have discovered that by constructing my gage of glass I derive two advantages over gages formed of metal. The first is that the gage while resting on the cutting-teeth does not dull them; and, secondly, these gages formed of glass are not injured or rendered worthless by the file while in use, as they would be if formed of metal.

After the saw has been properly jointed and filed, if it be intended for sawing hard wood, place a drag-tooth in the slot A of the gage, causing the surfaces B and C to rest upon the cutting-teeth adjacent to the drag-tooth, and pass the file into the opening D and dress the drag-tooth down as far as the gage will permit, and dress all the drag-teeth in a similar manner.

The relative positions of the surfaces B and C with the inner surface, $d$, of the gage is such that the drag-teeth are reduced with exact uniformity shorter than the cutting-teeth, which is found by experience should be for hard wood about one sixty-fourth of an inch. If the saw be intended for cutting soft wood, place the surfaces E and F upon the cutting-teeth and pass the drag-teeth into the slot G, and dress the drag-teeth down to the surface $d'$ of the gage. The surfaces E F and $d'$ are so related that this process shortens the drag-teeth about one thirty-sixth part of an inch shorter than the cutting-teeth, which is found to be a proper length for sawing soft wood. The set of a saw should also be different for hard and soft wood, and for hard and soft wood when in a frozen state.

For sawing hard wood, the cutting-teeth should be so set that their points will touch the surface $h$ when the face H of the gage is against the side of the saw.

For sawing hard timber when in a frozen state, the surface $h'$ is in like manner the gage for setting the saw.

For sawing soft timber, the surface $k$ of the face K is in like manner the gage for setting the saw; and for sawing soft timber when in a frozen state, the surface $k'$ of the face K is in like manner the gage for setting the saw, each of the surfaces $h$ $h'$ and $k$ $k'$ being removed a suitable distance from their respective faces H and K of the gage to serve as a gage for these several purposes.

Having thus described my invention, what I claim as new, and desire to secure by Letters Patent, is—

A saw filing and setting gage formed of glass, and having the opening D, the slots A and G, and the surfaces B and C and E and F, as and for the purposes substantially as set forth.

In testimony that I claim the above I have hereunto subscribed my name in the presence of two witnesses.

JOHN LEIST.

Witnesses:
 JAS. KEOGH, Jr.,
 F. J. HAMILTON.